US011539969B1

(12) United States Patent
King et al.

(10) Patent No.: US 11,539,969 B1
(45) Date of Patent: Dec. 27, 2022

(54) SYSTEM AND METHOD OF VIDEO ENCODING WITH DATA CHUNK

(71) Applicant: Zoox, Inc., Foster City, CA (US)

(72) Inventors: Andrew Lewis King, Los Altos, CA (US); James William Vaisey Philbin, Palo Alto, CA (US); Maxwell Ethan Mckenzie Yaron, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/127,893

(22) Filed: Dec. 18, 2020

(51) Int. Cl.
| | |
|---|---|
| *H04N 19/29* | (2014.01) |
| *H04N 19/86* | (2014.01) |
| *H04N 19/70* | (2014.01) |
| *H04N 19/167* | (2014.01) |
| *H04N 21/20* | (2011.01) |

(52) U.S. Cl.
CPC ........... *H04N 19/29* (2014.11); *H04N 19/167* (2014.11); *H04N 19/70* (2014.11); *H04N 19/865* (2014.11); *H04N 21/20* (2013.01)

(58) Field of Classification Search
CPC ...... H04N 19/29; H04N 19/167; H04N 19/70; H04N 19/865
See application file for complete search history.

(56) References Cited

U.S. PATENT DOCUMENTS

| | | | | |
|---|---|---|---|---|
| 2011/0228848 | A1* | 9/2011 | Dvir | H04N 19/107 375/E7.076 |
| 2015/0264224 | A1* | 9/2015 | Larson | H04N 5/77 348/700 |
| 2015/0281710 | A1* | 10/2015 | Sievert | H04L 65/762 375/240.02 |
| 2016/0275642 | A1* | 9/2016 | Abeykoon | G06V 10/94 |
| 2018/0349708 | A1* | 12/2018 | van Hoof | G08B 13/19684 |

* cited by examiner

Primary Examiner — Richard T Torrente
(74) Attorney, Agent, or Firm — Lee & Hayes, P.C.

(57) ABSTRACT

Techniques for encoding image data are discussed. Image data containing multiple image frames can be received from an image sensor associated with a vehicle. A first image frame and a second image frame may be associated with a first data chunk. A first metadata associated with the first image frame can be identified. Additionally, a second metadata associated with the second image frame can be identified. The first data chunk can be created that includes the first image frame, the second image frame, the first metadata, and the second metadata. The first data chunk can be stored in a video container, where the video container can be indexed to access the first image frame with the first metadata or the second image frame with the second metadata.

20 Claims, 10 Drawing Sheets

SYSTEM AND METHOD OF VIDEO ENCODING WITH DATA CHUNK

BACKGROUND

A vehicle can use image sensors to capture image data related to objects and landscapes in an environment proximate the vehicle. Some vehicles may capture image data on a continuous basis using multiple image sensors. In this situation, the vehicle may produce a large amount of video data that needs a large storage mechanism. To reduce the storage requirements, the captured image data may be compressed using a video compression algorithm. However, some video compression algorithms may result in a loss of image detail in the compressed image data and/or may be difficult to index in an efficient manner. The loss of image detail or the difficulty to index may compromise the safe and efficient operation of a vehicle that relies on the captured image data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
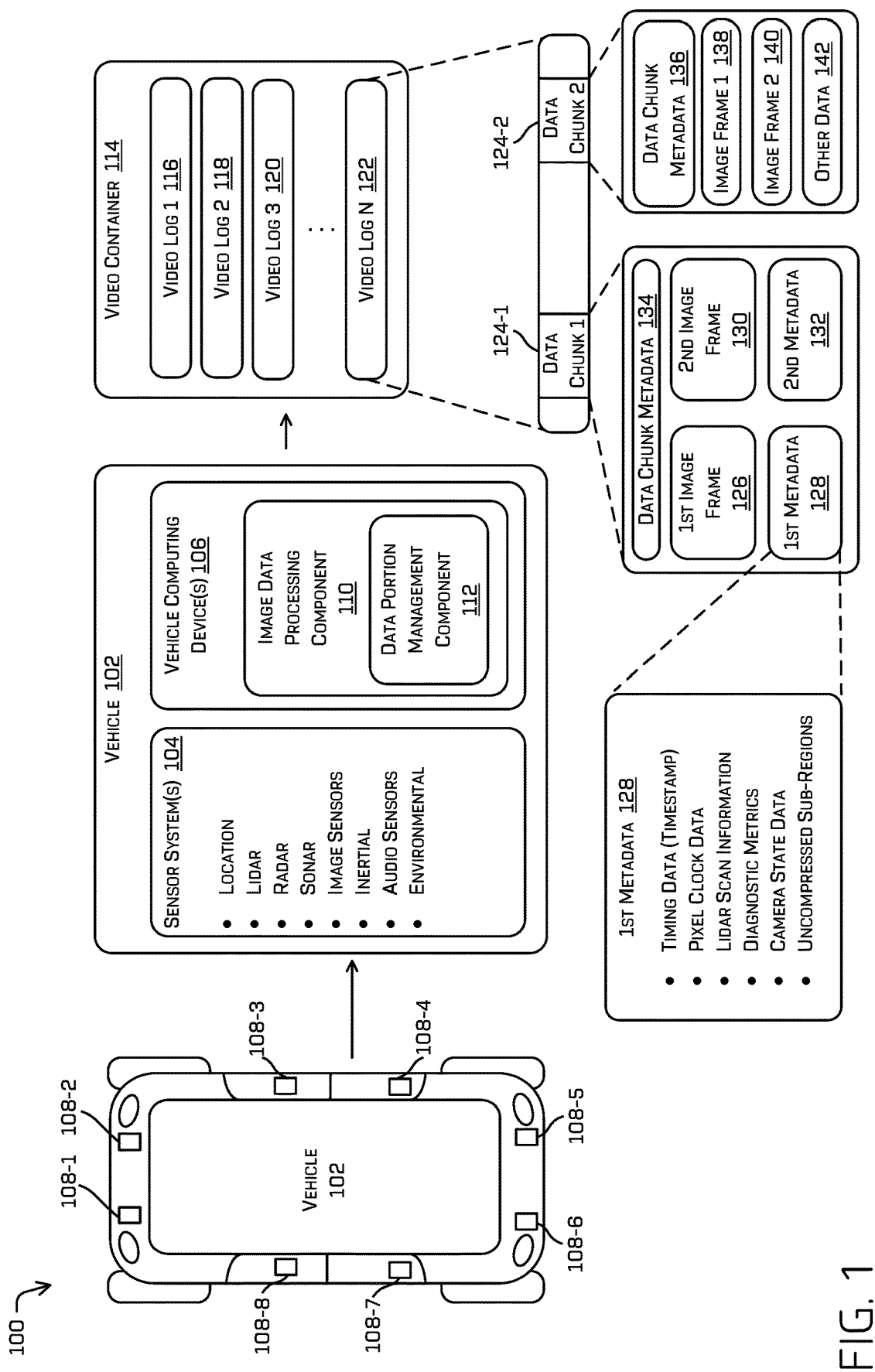
FIG. 1 is a schematic diagram illustrating an example implementation to encode video data generated by image sensors associated with an autonomous vehicle, in accordance with examples of the disclosure.

This disclosure is directed to techniques for encoding image data. In some examples, the image data may be received from image sensors associated with a vehicle. The vehicle may be an autonomous vehicle with multiple image sensors that capture images of an environment in which the vehicle is located. In some examples, multiple image frames are received from each image sensor. Any number of received image frames may be associated with a particular data portion (which may also be referred to as a data chunk). Additionally, metadata may be identified and associated with each image frame. In some examples, the metadata may include timestamp data associated with the associated image frame. This timestamp information allows particular image frames to be located quickly when a user or system is searching for image frames during a specific period of time. The data portion (or data chunk) can be created to include multiple image frames and the metadata associated with each of the multiple image frames. Additionally, the data portion can be discreetly decodable independent of any other data portions or image frames.

In some examples, image data containing multiple image frames can be received from an image sensor associated with a vehicle. A computing device may identify a range of image frames in the received image data that will be processed into multiple data chunks. A group of image frames (within the identified range of image frames) are identified to include in a first data chunk. Metadata can be identified for each image frame in the group, where the metadata includes timestamp information associated with the associated image frame. Additionally, portions (e.g., sub-regions) of each image frame may be identified to remain uncompressed or to be associated with uncompressed image data. The computing device may process the group of image frames, metadata associated with each image frame, and portions of each image frame to remain uncompressed into a data chunk. A timestamp may also be associated with the data chunk itself. A compressed data chunk may be created by compressing a first portion of the data chunk using a lossy compression algorithm and compressing a second portion of the data chunk using a lossless compression algorithm. The compressed version of the data chunk may be stored in a video container located in the vehicle or any other system external to the vehicle. This process can be repeated by creating additional data chunks for each group of image frames in the range of image frames identified for processing.

In some examples, a user or system may desire to review image frames captured by multiple image sensors associated with a vehicle. For example, if an accident or other event occurred at a particular time, the user or system may want to review all image frames captured by all image sensors associated with the vehicle near that particular time. The desired time period may extend from slightly before the accident/event (e.g., one or two minutes before the accident/event) to a couple minutes after the accident/event. By reviewing all image frames from all image sensors during the desired time period, details regarding the cause of the accident/event can be analyzed. This analysis can be performed by identifying multiple video logs containing recorded image frames from the multiple image sensors associated with the vehicle. A particular segment of time can be identified, such as slightly before the accident/event to a period of time after the accident/event. Multiple data chunks are accessed in each of the multiple video logs, where each of the multiple data chunks are associated with the particular segment of time. Metadata associated with each image frame in the accessed data chunks can be identified. Additionally, uncompressed image data associated with each image frame in the accessed data chunks can be identified. The information in the segment of time can be then analyzed based on the image frames contained in the accessed data chunks.

Since the data chunks include timestamp information, a computing device can quickly identify the relevant data chunks (and corresponding image frames) necessary to analyze the particular segment of time.

In some examples, data chunks may be compressed using multiple compression algorithms. Some image frames may have sub-regions that contain important image data (e.g., pedestrians, vehicles, traffic signs, and traffic signals) that remain uncompressed. The important sub-regions of the image frames are uncompressed to maintain the original image quality for analysis. These sub-regions may remain uncompressed or can be compressed with a lossless compression algorithm that does not degrade the original image quality. Other portions of the image frames (i.e., portions not included in the sub-regions) can be compressed with a lossy compression algorithm to minimize storage requirements.

In some examples, each image frame generated by an image sensor associated with a vehicle includes metadata associated with the image frame. The metadata may include pixel clock data, row readout data, image sensor exposure data, image sensor gain data, image sensor state data, image sensor processor tuning parameter data, lidar scan data, diagnostic metrics, image frame sub-region data, an indication of whether a lidar scan is associated with the first image frame, and the like. The metadata associated with each image frame can be useful for analyzing image frames, adjusting image sensor settings, identifying critical sub-regions of an image frame, identifying image frames that also have associated lidar data, and the like.

The techniques discussed herein can improve the functioning of a computing device of a vehicle in a number of ways. The described techniques can compress large amounts of image data received from one or more image sensors associated with a vehicle. This data compression can reduce storage space required to store the received image data. The compression techniques can maintain the most important image data (e.g., pedestrians, vehicles, traffic signs, and traffic signals) in an uncompressed format (or compressed using a lossless compression algorithm) to maintain the original image quality for analysis. The use of data chunks to store multiple image frames can provide fast random access to the stored image frames based on timestamps, or other indexing means. Each data chunk can be associated with metadata that defines compression used for the data chunk. Multiple data chunks can be stored within a video container and each chunk may be independently accessed and decoded without accessing other data chunks within the container. The described techniques can also store information to provide accurate sensor fusion, such as fusing the image frame data with data capturing using a different sensor modality, such as lidar. The techniques discussed herein may also provide additional inputs for training neural networks and may provide higher quality training data.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using image data. Additionally, the techniques described herein can be used with real data (e.g., captured using sensor(s)), simulated data (e.g., generated by a simulator), or any combination of the two.

FIG. 1 is a schematic diagram illustrating an example implementation 100 to encode video data generated by image sensors associated with an autonomous vehicle, in accordance with examples of the disclosure. As illustrated in FIG. 1, a vehicle 102 may include any number of image sensors (e.g., 108-1, 108-2, 108-3, 108-4, 108-5, 108-6, 108-7, and 108-8) that generate image frames (e.g., image data) representing visual aspects of an environment, such as environmental conditions, objects in the environment, and other environmental information proximate the vehicle 102.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details regarding the vehicle 102 are described herein.

In one example, the vehicle 102 includes eight image sensors (e.g., 108-1, 108-2, 108-3, 108-4, 108-5, 108-6, 108-7, and 108-8) disposed at different locations on the vehicle 102. Although eight image sensors 108 are shown in FIG. 1, other examples may include any number of image sensors 108 attached to a vehicle. In some examples, the multiple image sensors 108 are positioned and oriented to capture images from different regions of the environment proximate the vehicle 102. For example, different image sensors 108 may capture images of the environment ahead of the vehicle 102, behind vehicle 102, on both sides of the vehicle, and the like. In some implementations, all image sensors 108 are capturing image frames simultaneously and using the captured image data to navigate the vehicle 102 through the environment.

In addition to the image sensors 108, the vehicle 102 can be associated with other sensor system(s) 104 that may be disposed on the vehicle 102. For example, the sensor system(s) 104 can include location sensors (e.g., global positioning system (GPS), compass, etc.), light detection and ranging (lidar) sensors, radio detection and ranging (radar) sensors, ultrasonic transducers, sound navigation and ranging (sonar) sensors, image sensors (e.g., 108-1, 108-2, 108-3, 108-4, 108-5, 108-6, 108-7, and 108-8), inertial sensors (e.g., inertial measurement units, accelerometers, magnetometers, gyroscopes, etc.), wheel encoders, audio sensors, environment sensors (e.g., temperature sensors, humidity sensors, light sensors, pressure sensors, etc.), and the like. In some examples, image sensors 108 may be any type of camera that captures various image data, such as RGB (red, green, blue) data, IR (infrared) data, intensity, depth, time of flight, etc. The sensor system(s) 104 can generate sensor data, which may be utilized by the vehicle computing device(s) 106 associated with the vehicle 102.

In at least one example, the vehicle computing device(s) 106 may receive and process image data received from the multiple image sensors 108. The received image data may include any aspect of the environment in which the vehicle 102 is operating. Additionally, the vehicle computing device(s) 106 may identify metadata associated with the received image data and manage the storage of the image data and the metadata in a storage device, such as a video container 114.

The vehicle computing device(s) 106 may include an image data processing component 110 that performs various image data processing as discussed herein. Additionally, a data portion management component 112 may handle the separation and management of the image data into multiple data portions. A data portion may include one or more image frames received from one or more image sensors 108. As described herein, a data portion may include image data, metadata associated with the image data, and other information. As used herein, a "data portion" may also be referred to as a "data chunk." In particular implementations, a data portion (or data chunk) may contain any number of image frames and metadata associated with the image frames. In some examples, a data portion may also contain one or more additional types of data, such as uncompressed portions of an image frame, vehicle information, environment information, and the like. In some examples, a data chunk can contain a form of metadata, e.g., a header, including video compression/decoding information specific to the data chunk in addition to frame-specific metadata that may contain other information.

In some examples, the video container 114 stores multiple video logs 116, 118, 120, and 122, where each video log 116-122 can be associated with one of the image sensors 108. A particular example of the video container 114 may include any number of video logs 116-122. As discussed herein, the video logs 116-122 may contain multiple image frames captured using the image sensors 108 over a period of time, such as a period of seconds, minutes, or hours.

As shown in FIG. 1, the video log 122 includes data chunks 124-1 and 124-2 that represents any number of image frames collected by a particular image sensor 108 and/or compressed in a similar manner. In some examples, the image frames may be associated with a specific period of time. In other examples, the one or more data frames are a series of sequential image frames received from one of the image sensors 108. In some examples, the data chunk 124-1 includes at least a first image frame 126, a first metadata 128, a second image frame 130, and a second metadata 132. As discussed herein, the first and second image frames 126, 130 may be consecutive image frames received from one of the image sensors 108. Alternatively, the first and second image frames 126, 130 may be image frames received during a particular time period from one of the image sensors 108.

The first metadata 128 and second metadata 132 shown in FIG. 1 may include various information as described herein. For example, the first metadata 128 and the second metadata 132 may include pixel clock data, row readout data, image sensor exposure data, image sensor gain data, image sensor state data, image sensor processor tuning parameter data, lidar scan data, diagnostic metrics, image frame sub-region data, data used to decode one or more image frames, an indication of whether a lidar scan is associated with the first image frame, and the like. The first metadata 128 and the second metadata 132 may contain different types of information. For example, the first metadata 128 may contain image sensor exposure information, but the second metadata 132 may not contain image sensor exposure information. Thus, the size of the metadata stored for each image frame may vary from one image frame to another.

In some examples, data chunk 124-1 includes data chunk metadata 134, which includes metadata associated with the contents of data chunk 124-1, such as data decoding information, timestamp information, and other types of data as discussed herein. In some implementations, data chunk metadata 134 may include data to decode one or more of the image frames contained within data chunk 124-1. In some examples, the data to decode one or more image frames may be referred to as a data decode field.

In some examples, data chunk 124-2 includes data chunk metadata 136, a first image frame 138, a second image frame 140, and other data 142. As discussed herein, data chunk metadata 136 includes metadata associated with the contents of data chunk 124-2, such as data decoding information, timestamp information, and the like. In some examples, data chunk metadata 136 may include information related to decoding image frames 138 and 140. In these examples, data chunk 124-2 does not require separate metadata associated with each image frame 138, 140. In some implementations, data chunk 124-2 may also contain other data 142 that may include image data or any other kind of data.

In some implementations, the timing data contained in first metadata 128 and the second metadata 132 allows the first image frame 126 and the second image frame 130 to be accessed quickly within the video log 122. In some examples, the first metadata 128 and second metadata 132 may include additional information, such as the different types of information discussed herein. Although two image frames 126, 130 and two sets of metadata 128, 132 are shown in FIG. 1, a particular data chunk 124 may contain any number of image frames and corresponding sets of metadata.

Figure 2:
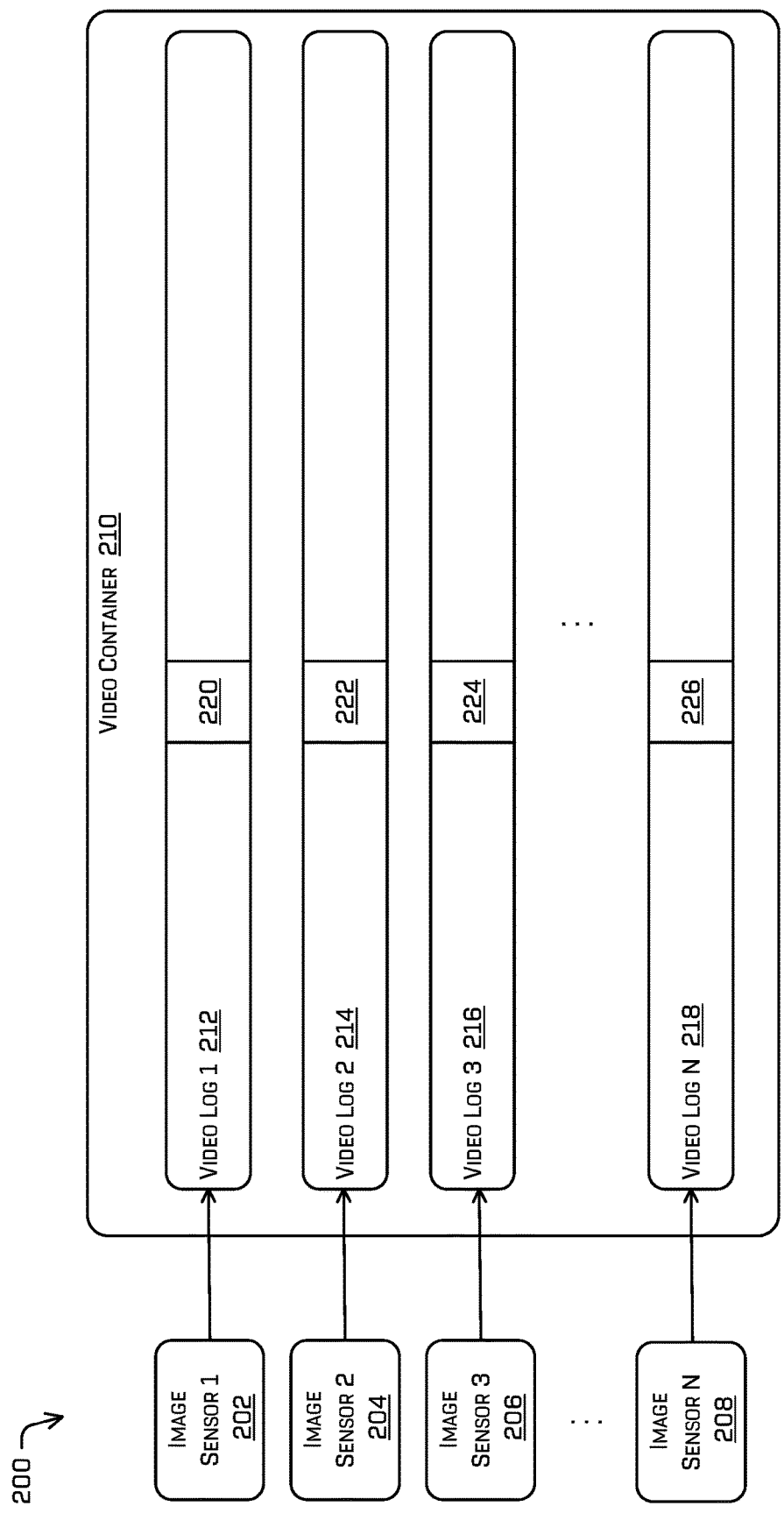
FIG. 2 is an illustration of receiving video data from multiple image sensors, creating a video log of image frames from each of the multiple image sensors, and storing the video logs in a video container, in accordance with examples of the disclosure.

FIG. 2 is an illustration 200 of receiving video data from multiple image sensors, creating a video log of image data from each of the multiple image sensors, and storing the video logs in a video container, in accordance with examples of the disclosure. As illustrated in FIG. 2, image sensors 202, 204, 206, and 208 provide captured image frames to video logs 212, 214, 216, and 218, respectively. Image sensors 202-208 are disposed on a vehicle, such as the vehicle 102 shown in FIG. 1. Particular implementations of the vehicle 102 may include any number of image sensors 202-208.

Each image sensor 202-208 can have an associated video log 212-218 that receives and stores image frames captured by the associated image sensor. In some examples, all image sensors 202-208 are operating simultaneously to provide image frame data to the video logs 212-218. Thus, the image sensors 202-208 can capture multiple image frames from different perspectives (e.g., the perspectives of each image sensor 202-208) simultaneously as the vehicle 102 moves through an environment. As illustrated in FIG. 2, the video logs 212-218 can be maintained in a video container 210. In some implementations, the video container 210 can be located within vehicle 102 (e.g., within a storage device located in vehicle 102). The video container 210 can be additionally or alternatively located remotely from the vehicle 102 and accessible via a wireless communication link or other communication mechanism.

In the example video container 210, a particular segment of time can be identified in each video log. For example, a segment of time 220 in video log 212, a segment of time 222 in video log 214, a segment of time 224 in video log 216, and a segment of time 226 in video log 218 are all associated with a specific time period. In some implementations, each video log 212-218 may include an hour or more of captured image frames. For example, the captured image frames in video logs 212-218 may be associated with a driving activity of the vehicle 102 as it drives through various environments. The specific time period associated with segments of time 220-226 may represent an actual range of time, such as Monday, Nov. 15, 2020 from 10:18:20-10:20:43 PST. This actual range of time may be of interest due to an event or activity (e.g., emergency braking maneuver, accident, and the like) that occurred during the range of time and was captured in the video logs 212-218. The event or activity may have directly impacted the vehicle 102 or may have been viewed by the image sensors 108 associated with the vehicle 102.

As discussed herein, the image frames stored in video container 210 may have associated timestamps or associated metadata that includes a timestamp associated with the image frame. These timestamps can allow the systems and methods described herein to temporally align the image frames in video logs 212-218 and the segments of time 220-226. Additionally, the timestamps support quick access to the specific image frames within the segments of time 220-226 by directly accessing the desired image frames without requiring access to additional image frames.

Figure 3:
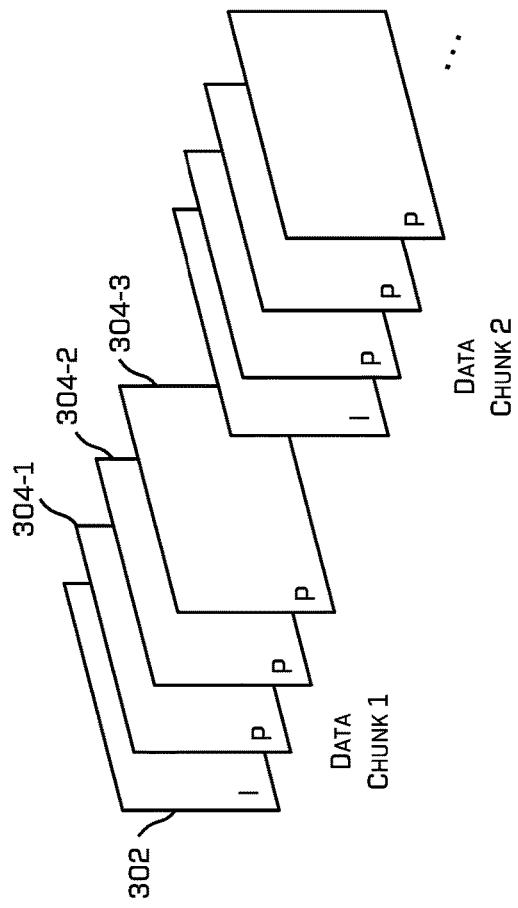
FIG. 3 is an illustration of encoding multiple data chunks associated with image frames received from at least one image sensor, in accordance with examples of the disclosure.

FIG. 3 is an illustration 300 of encoding multiple data chunks associated with image data (e.g., image frames) received from at least one image sensor, in accordance with examples of the disclosure. Two example data chunks are shown in FIG. 3, where each data chunk includes four image frames: one key frame 302 (labeled "I") and three predicted frames 304-1, 304-2, and 304-3 (labeled "P"). The four image frames 302, 304 may be associated with four sequential image frames captured by an image sensor. As described herein, each data chunk can be discreetly decodable independent of accessing any other data chunks. The keyframe 302 may contain a complete image frame captured by an image sensor and can be decoded independently of any other frames. The predicted frames 304 may contain "difference" data that identifies changes in the image from the previous frame. Thus, the size of the predicted frames 304 are typically smaller because the "difference" data is usually associated with a portion of the image rather than the entire image. Although four image frames are shown in the data chunks of FIG. 3, alternate implementations may include any number of image frames included in any number of data chunks. In some examples, the first frame of each data chunk is a key frame. The systems and methods described herein can select the key frame for each data chunk based on various factors. For example, a particular image frame may be selected as a key frame if it has associated lidar points (i.e., lidar overlay) or if the image frame is an uncompressed image frame with higher quality image data. A data chunk, as disclosed herein, may contain a plurality of keyframes and corresponding data to construct predicted frames. Additionally, each of data chunk 1 and data chunk 2 can be associated with corresponding metadata to decode the image frames contained therein. The metadata can include an encoder color space, a frame color space, and/or a codec identified, for example.

Figure 4:
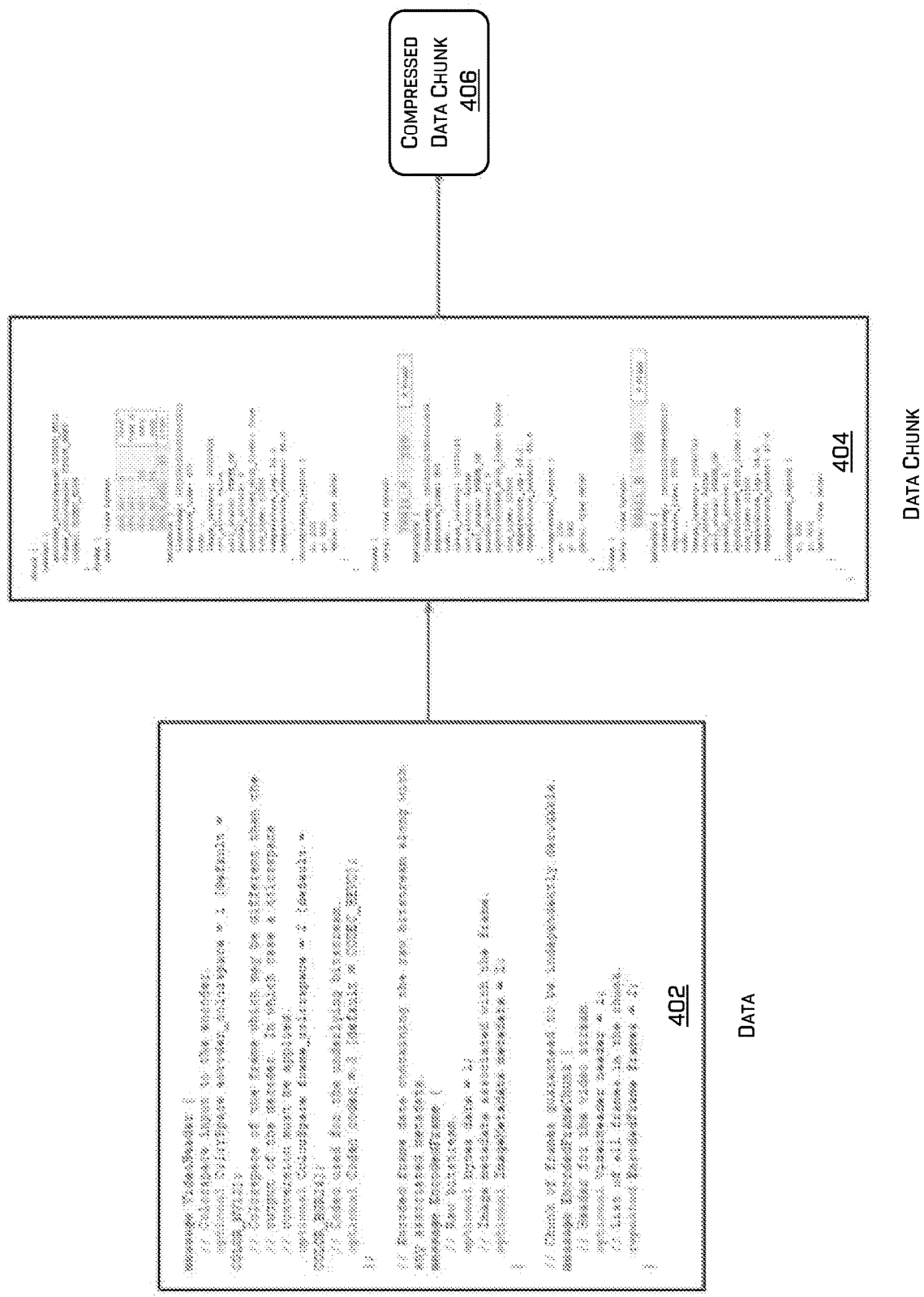
FIG. 4 is an illustration of an example process for creating a data chunk that includes image frames and metadata associated with the image frames, in accordance with examples of the disclosure.

FIG. 4 is an illustration of an example process 400 for creating a data chunk that includes image frames and metadata associated with the image frames, in accordance with examples of the disclosure. In some examples, block 402 contains video data and metadata associated with the video data. In some examples, the block 402 can include, but is not limited to, color space information (e.g., frame color space, encoder color space, etc.), codec information, encoded frame data comprising raw bitstream data along with associated metadata, an indication of a range of frames of the data chunk independently decodable, header data for the video stream, an indication of frames in the data chunk, and the like. The data contained in the block 402 can be processed into a data chunk 404 that contains a portion of the video data (e.g., specific image frames) and metadata associated with the portion of the video data. As discussed herein, the data contained in the data chunk 404 may be compressed into a compressed data chunk 406 using a lossless compression algorithm, such as Huffman coding.

Figure 5:
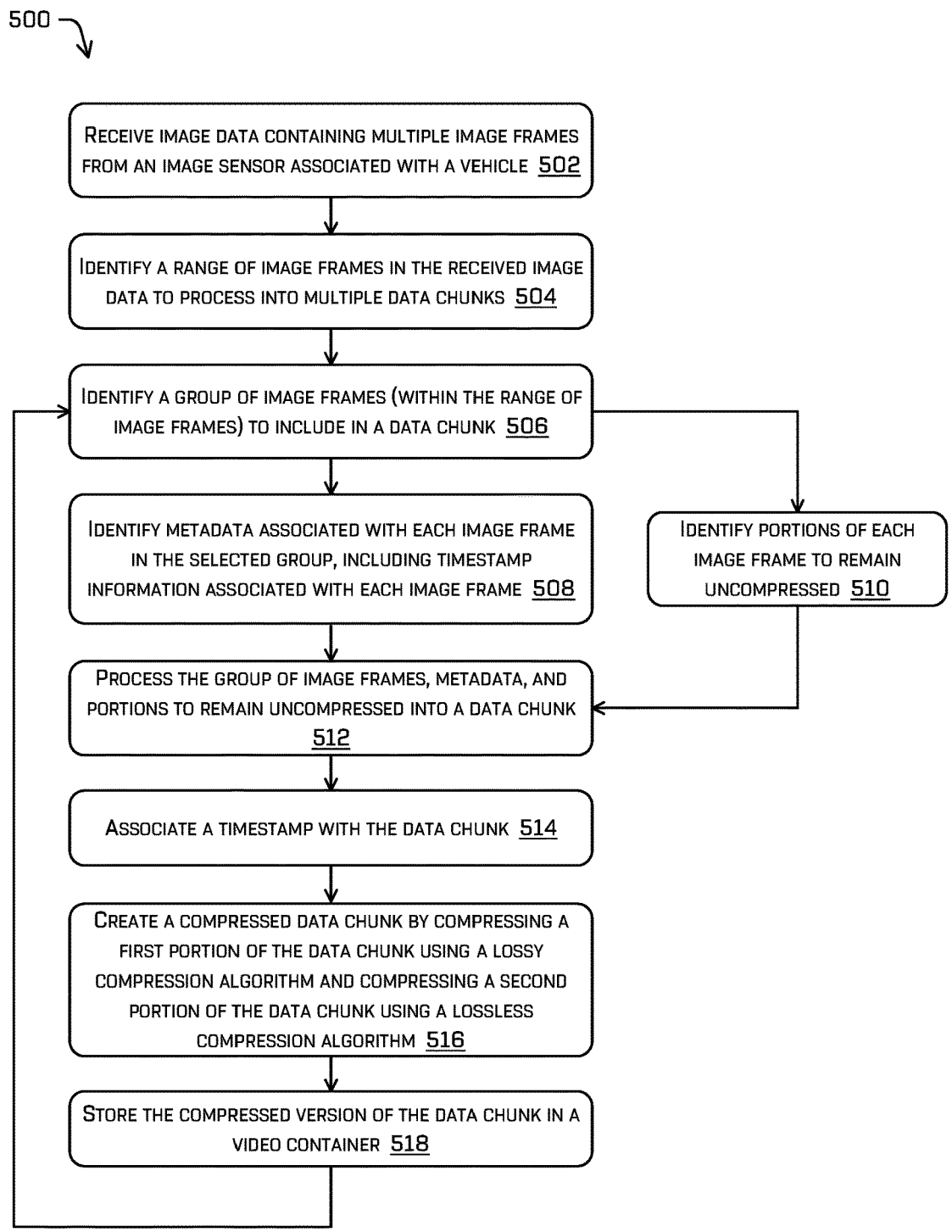
FIG. 5 is an illustration of an example process for generating a data chunk containing one or more image frames and metadata associated with the image frames, in accordance with examples of the disclosure.

FIG. 5 is an illustration of an example process 500 for generating a data chunk containing one or more image frames and metadata associated with the image frames, in accordance with examples of the disclosure. The operations described herein with respect to the process 500 may be performed by the vehicle computing device(s) 106, as illustrated in FIG. 1. In some examples, the operations may be performed by the image data processing component 110 of the vehicle computing device(s) 106, as illustrated in FIG. 1.

By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein.

At operation 502, the process may include receiving image data containing multiple image frames from an image sensor associated with a vehicle. In some examples, the image data may be collected by the multiple image sensors 108 associated with the vehicle 102, as illustrated in FIG. 1. The image data may represent various scenes in the environment in which the vehicle 102 is located. The image data may represent static objects, dynamic objects, road surfaces, sidewalk surfaces, and the like that are proximate the vehicle 102.

At operation 504, the process may include identifying a range of image frames in the received image data to process into multiple data chunks. As discussed with respect to FIG. 1, data chunks may include any number of image frames collected by a particular image sensor 108 as well as metadata associated with the image frames. In some examples, the range of image frames may represent any period of time, such as a time period when the vehicle 102 was driving a particular route, a time period during which a vehicle incident occurred, a time period when the vehicle 102 was driving in particular environmental conditions (e.g., rain, snow, or twilight), and the like.

At operation 506, the process may include identifying a group of image frames (within the range of image frames identified at operation 504) to include in a first data chunk. As discussed herein, the process 500 can be repeated to identify multiple groups of image frames to include in multiple data chunks until all image frames in the range of image frames have been included in a data chunk. In some examples, the process 500 selects groups of image frames sequentially from the range of image frames.

At operation 508, the process may include identifying metadata associated with each image frame in the group selected at operation 506. This metadata may include timestamp information associated with each image frame in the group. In some examples, the timestamp information can be provided by an associated image sensor, and in some examples, the timestamp information can be provided by an image sensor processor associated with the image sensor. In some examples, timestamp data can include timestamps from a plurality of devices to track or otherwise log system processing, system latency, data paths, etc.

At operation 510, the process may include identifying portions of each image frame to remain uncompressed. As discussed herein, in some situations a portion of an image frame is compressed and other portions of the same image frame may remain uncompressed. For example, critical information in an image frame may remain uncompressed to provide the best possible image quality in those portions of the image frame. Critical information that remains uncompressed may include, for example, images of pedestrians, images of other vehicles, images of traffic signs, images of traffic lights, images of other objects in the roadway, and the like. Alternatively, critical information portions of a frame may be compressed using a lossless compression algorithm.

At operation 512, the process may include processing the group of image frames, metadata, and portions to remain uncompressed into a data chunk. At operation 514, the process may include associating a timestamp with the data chunk. In this example, each image frame in the data chunk has an associated timestamp stored in the metadata associated with the data chunk. Additionally, the data chunk has an associated timestamp. These timestamps allow particular image frames and data chunks to be discreetly identified and decoded independent of the other image frames and other data chunks. In some examples, the time stamp associated with the data chunk can represent the time stamp of the first frame in the data chunk and/or time information associated with any frame in the chunk. In some examples, the timestamp can be a timestamp associated with the data chunk as a whole that may be separate from any timestamps associated with individual frames.

At operation 516, the process may include creating a compressed data chunk by compressing a first portion of the data chunk using a lossy data compression algorithm and compressing a second portion of the data chunk using a lossless data compression algorithm. In some examples, the portions to remain uncompressed may be copied from the image frame to the metadata at operation 512 so any lossy compression of the image frame will not cause a loss of resolution of the uncompressed portions copied to the metadata. In other examples, the image frame portions to remain uncompressed may be identified and stored on another storage system for future retrieval. As disclosed herein, each data chunk can include compression/decoding metadata that can enable each data chunk to be independently decoded without accessing other data chunks within a video container.

Additional examples of processing different regions of data at different resolution levels or compression levels can be found in U.S. patent application Ser. No. 16/433,901 titled "Optimizing Data Levels for Processing, Transmission, or Storage Based On Location Information" and filed on Jun. 6, 2019, the entirety of which is herein incorporated by reference in its entirety for all purposes.

At operation 518, the process may include storing the compressed version of the data chunk in a video container. As discussed with respect to FIG. 1, the video container may store multiple video logs, each of which contain multiple data chunks. The process then returns to operation 506 to identify another group of image frames to include in another data chunk.

When image frames from image sensors are processed into multiple data chunks using process 500, each data chunk (and each image frame) can be discreetly decodable based on the metadata associated with the data chunk (or image frame) independent of any other data chunks and independent of any other image frames.

In some examples, the uncompressed portions of an image frame are cropped from the image frame and stored in the metadata while the original image frame may be fully compressed using a lossy compression algorithm. Since the uncompressed portions have already been cropped from the image frame and stored in the metadata, the entire frame can be compressed using the lossy compression algorithm without losing image detail in the uncompressed portions stored in the metadata. The compressed and uncompressed portions of the image frame can be linked together for future analysis and review of the image data.

Figure 6:
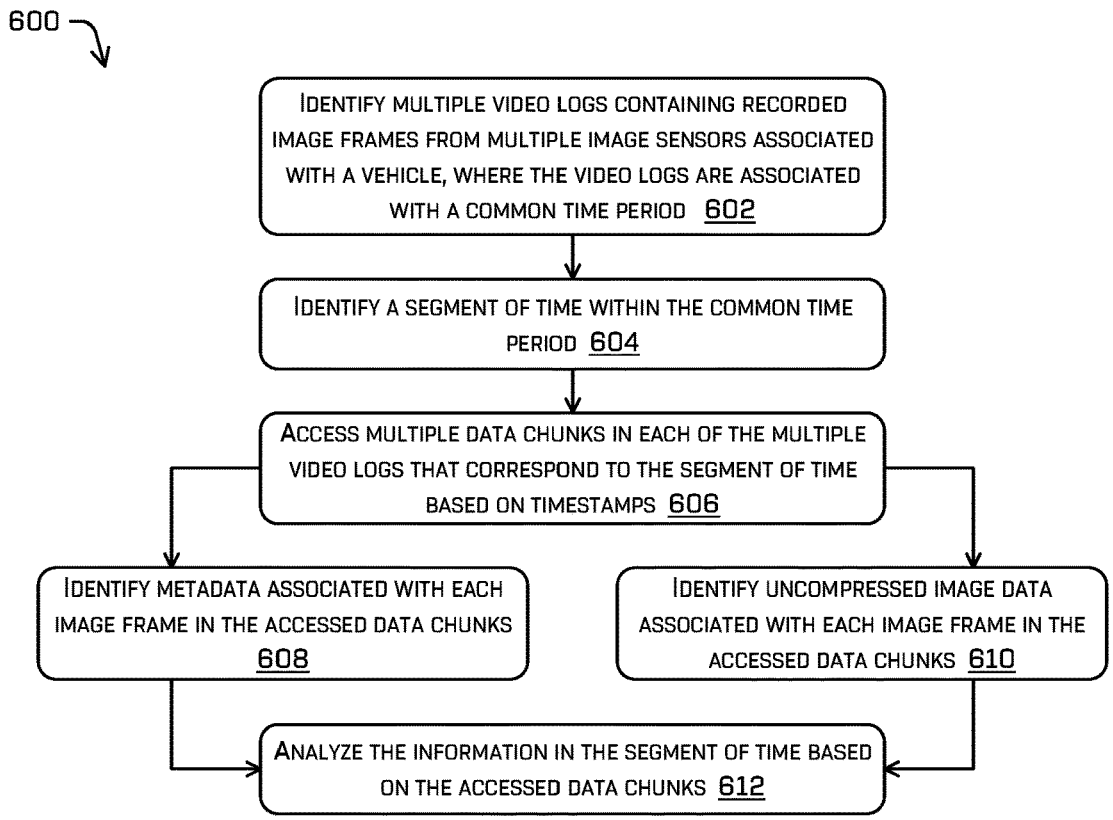
FIG. 6 is an illustration of an example process for accessing a common time region from multiple video logs associated with multiple image sensors on a vehicle, in accordance with examples of the disclosure.

FIG. 6 is an illustration of an example process 600 for accessing a common time region from multiple video logs associated with multiple image sensors on a vehicle, in accordance with examples of the disclosure. The operations described herein with respect to the process 600 may be performed by the vehicle computing device(s) 106, as illustrated in FIG. 1. In some examples, the operations may be performed by the image data processing component 110 of the vehicle computing device(s) 106, as shown in FIG. 1.

By way of example, the process 600 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 600. In some examples, multiple branches represent alternate implementations that may be used separately or in combination with other operations discussed herein.

At operation 602, the process may include identifying multiple video logs containing recorded image frames from multiple image sensors associated with a vehicle. In some examples, the multiple video logs may include video logs 212-218 shown in FIG. 2. In some implementations, the multiple video logs are associated with a common time period, similar time periods, or partially overlapping time periods.

At operation 604, the process may include identifying a segment of time within the common time period. For example, the segment of time may be associated with an activity, incident, or other event that someone (or some system) wants to analyze. In some situations, a user or system may want to identify image frames from all image sensors on a particular vehicle to view all image frames showing the activity, incident, or event from different perspectives based on the different positions and orientations of the multiple image sensors.

At operation 606, the process may access multiple data chunks in each of the video logs that correspond to the segment of time based on timestamps. As discussed herein, metadata associated with each image frame may include a timestamp (or timecode) of the image frame. Additionally, each data chunk may have an associated timestamp. These timestamps allow the systems and methods described herein to quickly access the specific image frames in each video log that are associated with the identified segment of time. Further, the timestamps allow the described systems and methods to quickly access and decode just the relevant video portions, rather than decoding the entire video logs, which would be time-consuming and computationally expensive.

At operation 608, the process may include identifying metadata associated with each image frame in the accessed data chunks. Additionally, at operation 610, the process may include identifying uncompressed image data associated with each image frame in the accessed data chunks.

At operation 612, the process may include analyzing the information in the segment of time based on the accessed data chunks. For example, the process may analyze image data, metadata, and uncompressed image data within the accessed data chunks (and the image frames within the accessed data chunks). As discussed herein, this information may be analyzed to evaluate, for example, an activity, incident, or event associated with (or occurring proximate) a vehicle having image sensors that generated the video logs.

In some examples, the described systems and methods may access precise segments of image data that are used to train other models and systems. For example, the systems and methods may analyze one or more video logs to find all situations where a particular activity occurred. Activities may include, for example, another vehicle changed lanes in front of the vehicle creating the video log, a pedestrian stepped in front of the vehicle creating the video log, and the like. The systems and methods may access all image frames associated with the particular activity and train a model to detect that activity in the future using the accessed image frames. The ability to identify precise image frames as described herein can be advantageous to an autonomous vehicle processing pipeline.

In some examples, image frame data may be fused with lidar point data. This fusion may also be referred to as overlaying the lidar point data on an image frame or projecting the lidar points into the image space. This fusion of image frame data with lidar point data allows the lidar point data to be displayed or analyzed simultaneously with the image frame data. For example, a viewer of the fused image frame data and lidar point data will see both the image frame data (which may include multiple bounding boxes) and the lidar points displayed over the image frame data. This allows the viewer or analysis system to see both types of data for the scene at the same time, thereby providing a greater depth of information about the scene.

When fusing image frame data with lidar point data, it can be important to determine the timing profiles of the lidar data as well as the image data to correctly align the data sets temporally. In some examples, the timing profiles may include multiple exposure times and use of a rolling shutter. A rolling shutter captures an image one horizontal line at a time rather than capturing the entire image at one time. With the rolling shutter, different lines of an image are captured at different times. For example, the first line of an image can be captured at time $t_0$ and the last line of an image can be captured at a time $t_N$, which is subsequent to time $t_0$. The time difference between $t_0$ and $t_N$ can be the time required to capture the lines of the image between the first line and the last line of the image. For the lidar point data, a timestamp can be associated with each lidar point. To fuse the image frame data with the lidar point data, a system or method may identify a time associated with a particular lidar point and identify a particular line of an image that corresponds temporally to the lidar point timestamp.

When using image data captured using a rolling shutter, metadata may be associated with the captured image data. For example, the metadata may include a pixel clock, a capture timestamp, a row time, horizontal blank information, vertical blank information, an indication of whether a particular image has associated lidar data, and the like.

Additional examples of fusing image frame data with lidar point data, including scan lines captured during a rolling shutter image capture, can be found in U.S. Pat. No. 10,582,137 titled "Multi-Sensor Data Capture Synchronization," the entirety of which is herein incorporated by reference in its entirety for all purposes. In some examples, metadata can be included to facilitate sensor fusion, including but not limited to, pose information (e.g., of an image sensor, of a vehicle, etc.), sensor sync information (e.g., timing information indicative of when a signal was issued to capture sensor data (e.g., image sensor data, lidar data, radar data, etc.), timing information indicative of when such sensor data was captured, etc.), intrinsic sensor data, extrinsic sensor data, and the like.

In some examples, the image sensors discussed herein may include various diagnostic metrics, which may also be referred to as safety metrics. These diagnostic metrics may be reported for each captured image frame and may be included in the metadata for each image frame. Example diagnostic metrics may include image sensor temperature, voltage, cyclic redundancy check (CRC) failures, retransmission events, dropped packets, automotive safety integrity level (ASIL) state, broken pixels, synchronization status, clock monitor, and the like. By storing diagnostic metrics in metadata associated with the captured image frames, systems and methods may analyze the image frames and associated metadata when an error occurs. For example, the systems and methods may determine the types of errors that often occur when operating at high temperatures, low temperatures, and the like.

Figure 7A:
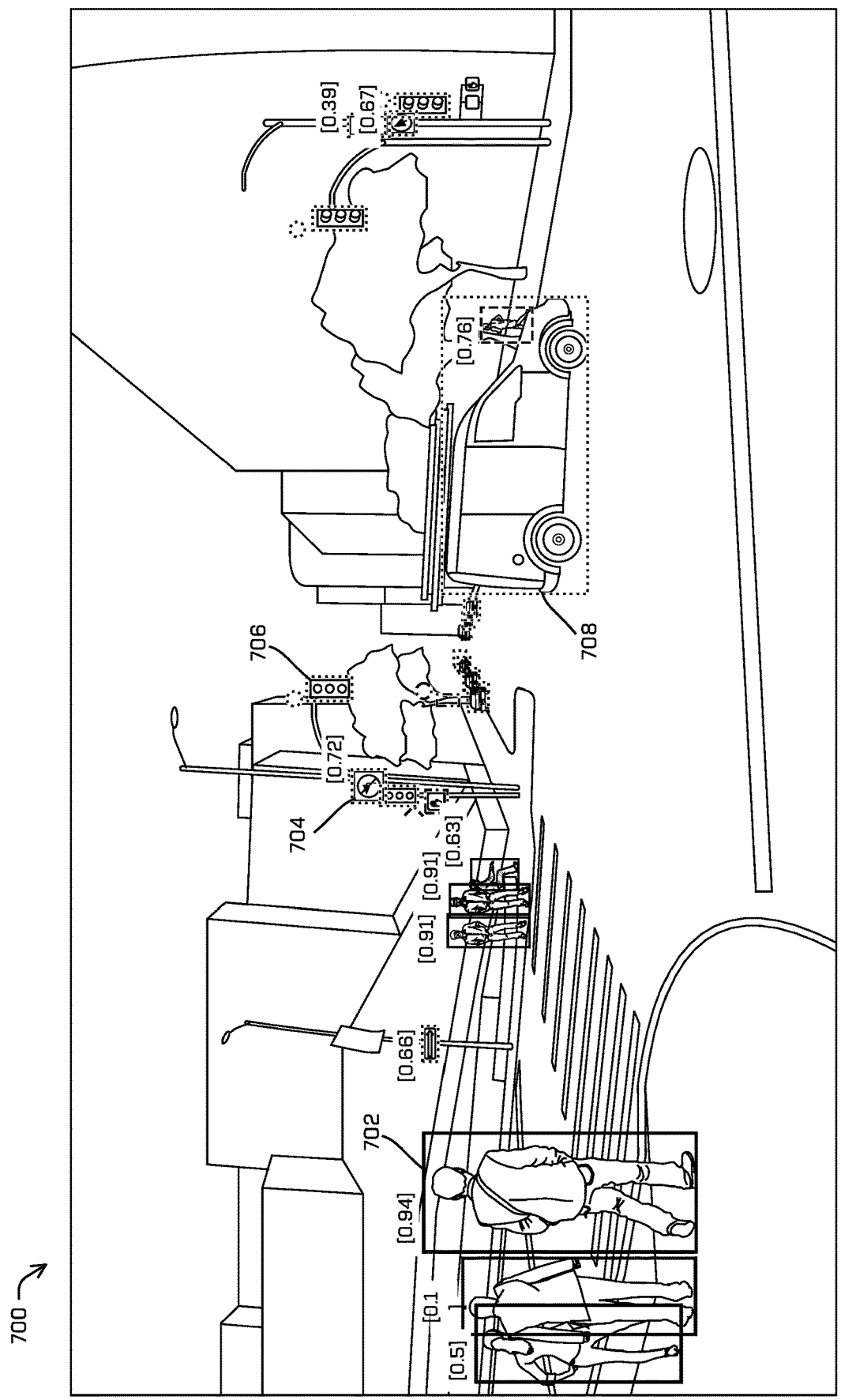
FIGS. 7A-7C illustrate an image frame with multiple identified sub-regions that remain uncompressed, in accordance with examples of the disclosure.
Figure 7B:
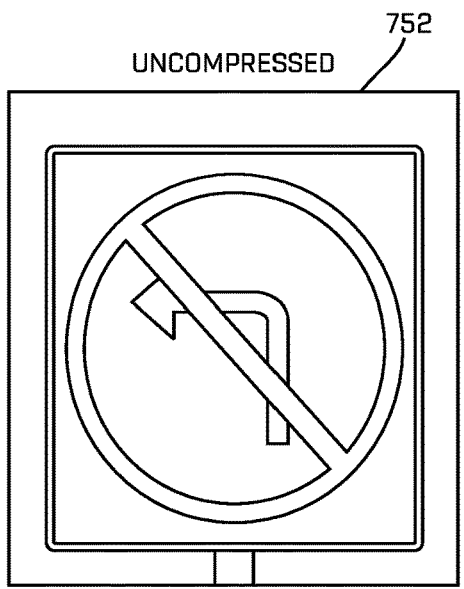
Figure 7C:
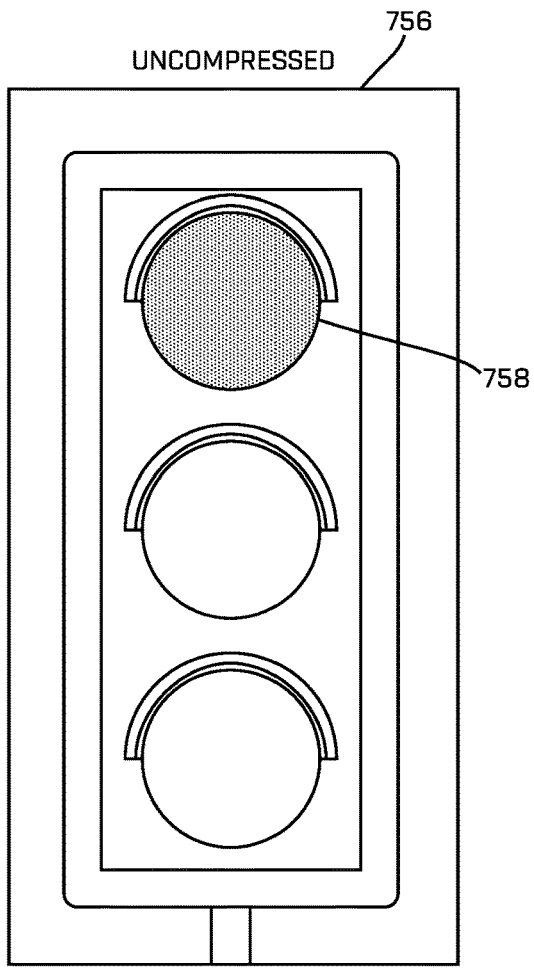

FIGS. 7A-7C illustrate an image frame 700 with multiple identified sub-regions that remain uncompressed, in accordance with examples of the disclosure. In particular, FIG. 7A illustrates multiple bounding boxes that represent important portions of the image frame 700, such as pedestrians, vehicles, traffic signs, traffic signals, and the like. The multiple bounding boxes represent regions of interest within the image frame 700. For example, bounding box 702 identifies a pedestrian in the image frame 700, bounding box 704 identifies a traffic sign in the image frame 700, bounding box 706 identifies a traffic signal in the image frame 700, and bounding box 708 identifies a vehicle in the image frame 700. In some examples, the bounding boxes shown in FIG. 7A represent important sub-regions of the image frame 700 that should not be compressed with a lossy compression algorithm. The important sub-regions identified by the bounding boxes may be analyzed immediately or in the future, and it may be important to maintain those portions of the image frame 700 at full resolution.

The multiple bounding boxes shown in FIG. 7A may be stored as metadata associated with the image frame 700. For example, the coordinates (or other identifying location data) of each bounding box within the image frame 700 may be stored as metadata associated with the image frame 700. Alternatively, the actual image data contained within the multiple bounding boxes shown in image frame 700 may be stored as metadata associated with the image frame 700.

The example of FIG. 7B illustrates an image of an uncompressed traffic sign 752 (corresponding to bounding box 704 in FIG. 7A) and an image of an uncompressed traffic signal 756 (corresponding to bounding box 706 in FIG. 7A). As shown in FIG. 7B, the uncompressed traffic sign 752 contains sharp edges that clearly define the arrow and the circle/line indicating that left turns are not permitted. Similarly, the uncompressed traffic signal 756 indicates a red light 758 that is bright and clearly defined.

Lossy compression algorithms may degrade image data. For example, FIG. 7C illustrates an image of a compressed traffic sign 754 (corresponding to bounding box 704 in FIG. 7A) and an image of a compressed traffic signal 760 (corresponding to bounding box 706 in FIG. 7A). In some examples, both the traffic sign 754 and the traffic signal 760 are compressed using a lossy compression algorithm. As shown in FIG. 7C, the compressed image of the traffic sign 754 is blurry and the red color of the arrow and circle/line are not sharp or clearly defined. This degraded image of the traffic sign 754 may hinder the ability of image analysis systems and methods to accurately identify the compressed image of the traffic sign 754 as a "no left turn" sign. Similarly, the compressed image of the traffic signal 760 is blurry and the red color of the red light 762 is not bright or clearly defined. This degraded image of the traffic signal 760 may hinder the ability of image analysis systems and methods to accurately identify the compressed image of the traffic signal 760 as a red light signal.

In some examples, if a particular image frame contains numerous important sub-regions that are to remain uncompressed or compressed using a lossless compression algorithm, the described systems and methods may not compress any part of the image frame or use a lossless compression algorithm for the entire frame. Rather than identifying a large number of sub-regions and maintaining those sub-regions as uncompressed, it may be faster and less computationally expensive to leave the entire image frame as uncompressed.

Figure 8A:
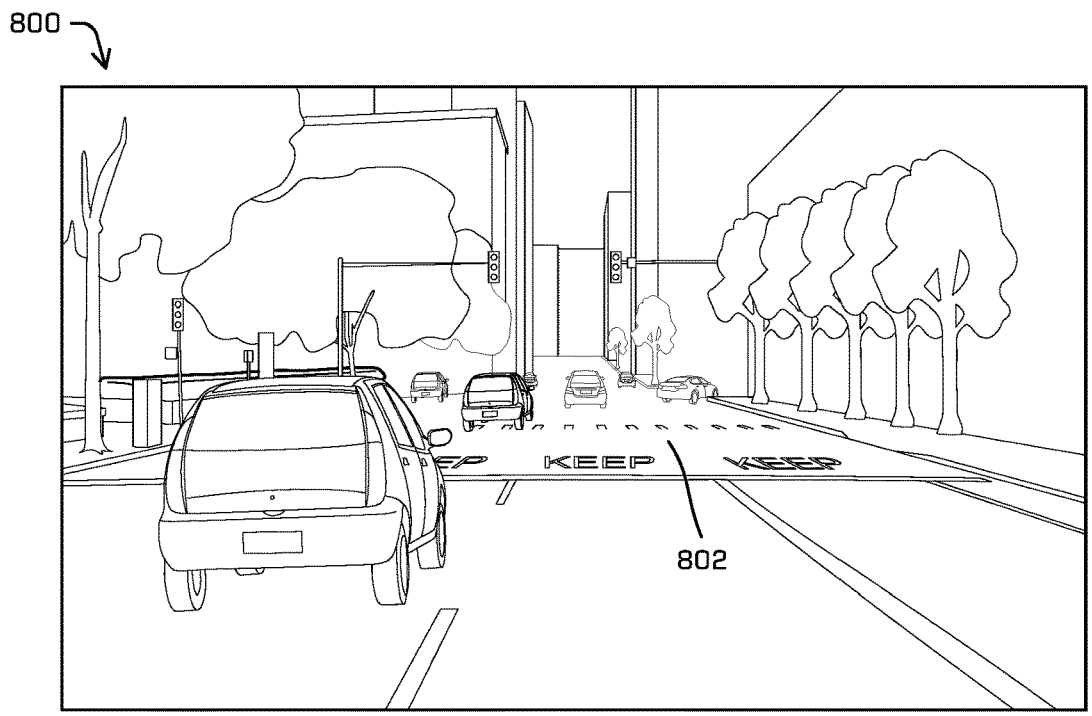
FIGS. 8A and 8B illustrate different versions of the same scene captured by image sensors with different image tuning parameters, in accordance with examples of the disclosure.
Figure 8B:
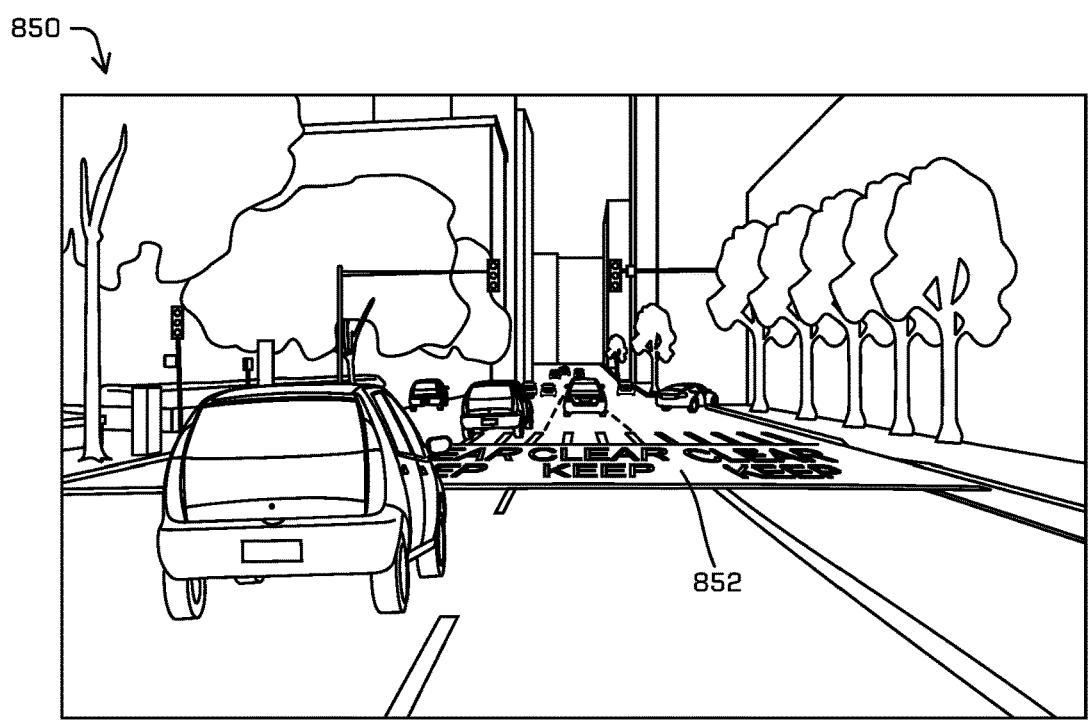

FIGS. 8A and 8B illustrate different versions of the same scene captured by image sensors with different image tuning parameters, in accordance with examples of the disclosure. As shown in FIG. 8A, an image frame 800 illustrates a particular scene in an overly saturated manner. For example, the image frame 800 can be too bright, which prevents the image sensor capturing certain aspects of the scene. In the example of FIG. 8A, the saturation of the image frame 800 causes the words "Clear" from being captured. Instead, there is a blank region 802 in the image frame 800 where the words "Clear" should be displayed. Additionally, the lane markers (e.g., broken lines) on the pavement near blank region 802 and farther down the road are not displayed. This lack of image information may degrade the performance of systems and methods that are analyzing the information in the image frame 800.

As shown in FIG. 8B, an image frame 850 illustrates the same scene as the image frame 800 discussed above. In the image frame 850, different image parameter settings are used with the image sensor. This difference in image parameters causes the image frame 850 to provide more details regarding the captured scene. For example, in the image frame 850, the words "Clear" 852 are easy to distinguish. Additionally, the lane markers shown ahead of the words "Clear" 852 are easy to identify in the image frame 850.

In some examples, if a saturated image (e.g., the image frame 800) is detected, the described systems and methods may tune (or adjust) one or more image sensor parameters to improve subsequent image frames captured by the image sensor. For example, an image sensor processor (ISP) associated with an image sensor can change various image sensing parameters, such as an image exposure, an amount of time spent integrating a scene, an analog gain response, a color correction matrix, and the like. The image sensor parameters may be changed after each image frame is captured to quickly improve exposure time and other parameters that may improve the quality of the next image frame captured by the image sensor.

In some examples, image frame data can be stored with associated metadata, which allows other systems and methods to analyze the image frame data and metadata to learn how to adjust image sensor settings to produce better quality image frames. For example, if a specific image frame is determined to be saturated, particular systems and methods may analyze the image frame and associated metadata, then compare the saturated image frame data with non-saturated image frame data. This analysis may help train systems and methods to adjust one or more image sensor settings to avoid future image saturation situations.

Figure 9:
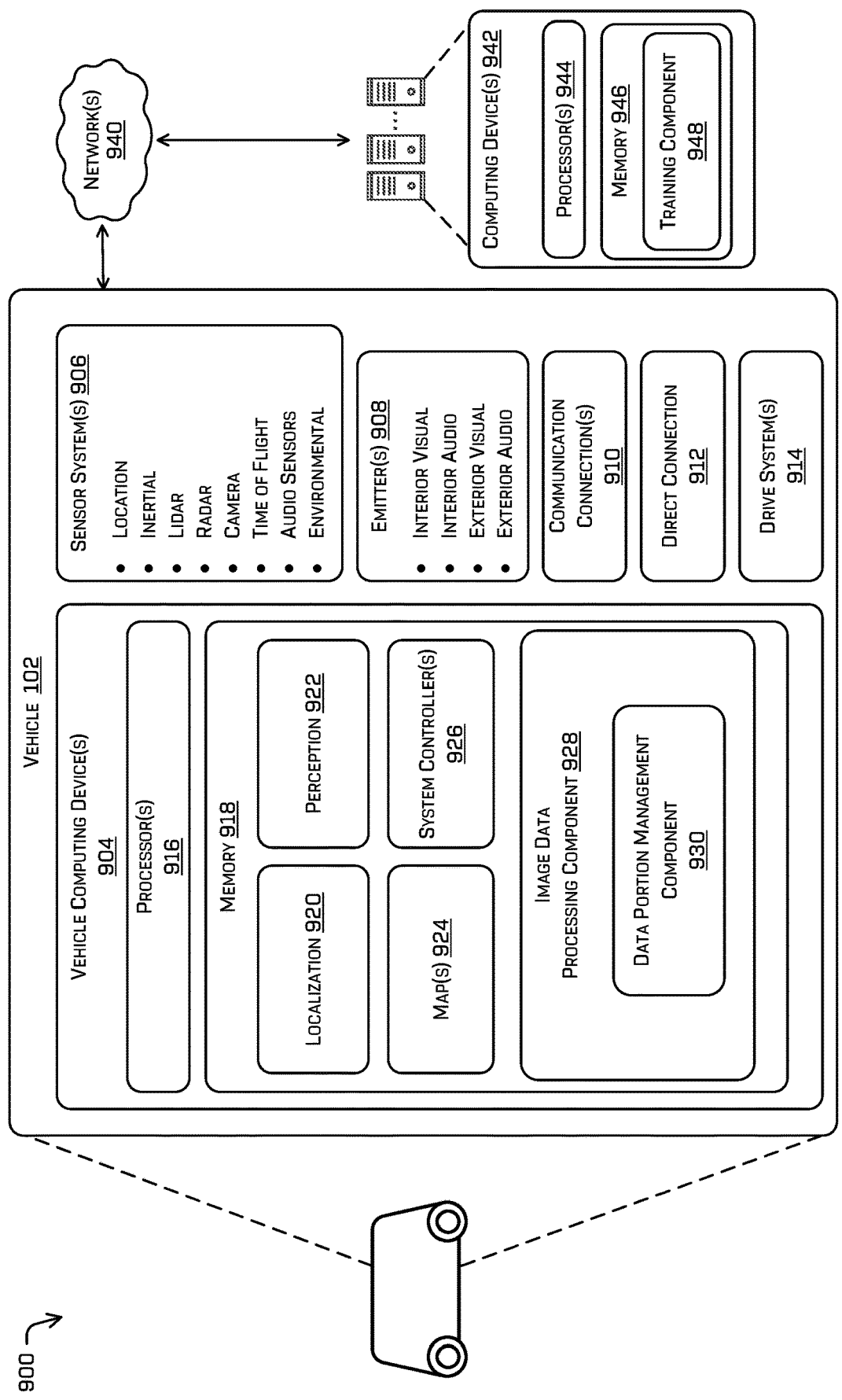
FIG. 9 is an illustration of an example system for implementing the techniques described herein.

FIG. 9 is an illustration of an example system 900 for implementing the techniques described herein. The vehicle 102 may include one or more vehicle computing devices 904, one or more sensor systems 906, one or more emitters 908, one or more communication connections 910, at least one direct connection 912, and one or more drive systems 914.

The vehicle computing device 904 may include one or more processors 916 and memory 918 communicatively coupled with the one or more processors 916. In the illustrated example, the vehicle 102 is an autonomous vehicle. However, the vehicle 102 may be any other type of vehicle. In the illustrated example, the memory 918 of the vehicle computing device 904 stores a localization component 920, a perception component 922, one or more maps 924, one or more system controllers 926, an image data processing component 928 comprising at least a data portion management component 930. Though depicted in FIG. 9 as residing in memory 918 for illustrative purposes, it is contemplated that the localization component 920, the perception component 922, the one or more maps 924, the one or more system controllers 926, the image data processing component 928, and the data portion management component 930 may additionally, or alternatively, be accessible to the vehicle 102 (e.g., stored remotely).

In at least one example, the localization component 920 may include functionality to receive data from the sensor system(s) 906 to determine a position and/or orientation of the vehicle 102 (e.g., one or more of an x-, y-, z-position, roll, pitch, or yaw). For example, the localization component 920 may include and/or request/receive a map of an environment and may continuously determine a location and/or orientation of the autonomous vehicle within the map. In some instances, the localization component 920 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 920 may provide data to various components of the vehicle 102 to determine an initial position of an autonomous vehicle for generating a trajectory and/or for generating or receiving map data, as discussed herein.

In some instances, the perception component 922 may include functionality to perform object detection, segmentation, and/or classification. In some examples, the perception component 922 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 922 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 918 may further include one or more maps 924 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 924 may include at least one map (e.g., images and/or a mesh). In some examples, the vehicle 102 may be controlled based at least in part on the map(s) 924. In some examples, the one or more maps 924 may be stored on a remote computing device(s) (such as the computing device(s) 942) accessible via network(s) 940. In some examples, multiple maps 924 may be stored based on, for example, a characteristic (e.g., type of entity, time of day, day of week, season of the year, etc.). Storing multiple maps 924 may have similar memory requirements but increase the speed at which data in a map may be accessed.

In at least one example, the vehicle computing device 904 may include one or more system controllers 926, which may be configured to control steering, propulsion, braking, safety, emitters, communication, and other systems of the vehicle 102. These system controller(s) 926 may communicate with and/or control corresponding systems of the drive system(s) 914 and/or other components of the vehicle 102.

In some examples, the image data processing component 928 may process the image data received by a plurality of image sensors associated with the vehicle 102. Such an image data processing component 928 may comprise the data portion management component 930, as described herein. The image data processing component 928 may receive the image frame data generated by the image sensors of vehicle 102 to identify information within the image frames as described herein. In some examples, the data portion management component 930 manages data chunks, identifies groups of image frames to include in each data chunk, identify metadata to include in each data chunk, associates a timestamp with each data chunk, and the like.

In some instances, aspects of some or all of the components discussed herein may include any models, algorithms, and/or machine learning algorithms. For example, in some instances, the components in the memory 918 (and the memory 946, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 906 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 906 may include multiple instances of each of these or other types of sensors. For instance, the lidar sensors may include individual lidar sensors located at the corners, front, back, sides, and/or top of the vehicle 102. As another example, the image sensors may include multiple cameras disposed at various locations about the exterior and/or interior of the vehicle 102. The sensor system(s) 906 may provide input to the vehicle computing device 904. Additionally, or alternatively, the sensor system(s) 906 may send sensor data, via the one or more networks 940, to the one or more computing device(s) 942 at a particular frequency, after a lapse of a predetermined period of time, in near real-time, etc.

The vehicle 102 may also include one or more emitters 908 for emitting light and/or sound, as described above. The emitters 908 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 910 that enable communication between the vehicle 102 and one or more other local or remote computing device(s). For instance, the communication connection(s) 910 may facilitate communication with other local computing device(s) on the vehicle 102 and/or the drive system(s) 914. Also, the communication connection(s) 910 may allow the vehicle to communicate with other nearby computing device(s) (e.g., other nearby vehicles, traffic signals, etc.). The communications connection(s) 910 also enable the vehicle 102 to communicate with a remote teleoperation computing device or other remote services.

The communications connection(s) 910 may include physical and/or logical interfaces for connecting the vehicle computing device 904 to another computing device or a network, such as network(s) 940. For example, the communications connection(s) 910 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 914. In some examples, the vehicle 102 may have a single drive system 914. In at least one example, if the vehicle 102 has multiple drive systems 914, individual drive systems 914 may be positioned on opposite ends of the vehicle 102 (e.g., the front and the rear, etc.). In at least one example, the drive system(s) 914 may include one or more sensor systems to detect conditions of the drive system(s) 914 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 914. In some cases, the sensor system(s) on the drive system(s) 914 may overlap or supplement corresponding systems of the vehicle 102 (e.g., sensor system(s) 906).

The drive system(s) 914 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 914. Furthermore, the drive system(s) 914 also include one or more communication connection(s) that enable communication by the respective drive system with one or more other local or remote computing device(s).

In at least one example, the direct connection 912 may provide a physical interface to couple the one or more drive system(s) 914 with the body of the vehicle 102. For example, the direct connection 912 may allow the transfer of energy, fluids, air, data, etc. between the drive system(s) 914 and the vehicle. In some instances, the direct connection 912 may further releasably secure the drive system(s) 914 to the body of the vehicle 102.

In some examples, the vehicle 102 may send sensor data to one or more computing device(s) 942 via the network(s) 940. In some examples, the vehicle 102 may send raw sensor data to the computing device(s) 942. In other examples, the vehicle 102 may send processed sensor data and/or representations of sensor data to the computing device(s) 942. In some examples, the vehicle 102 may send sensor data to the computing device(s) 942 at a particular frequency, after a lapse of a predetermined period of time, in near real-time, etc. In some cases, the vehicle 102 may send sensor data (raw or processed) to the computing device(s) 942 as one or more log files.

The computing device(s) 942 may include processor(s) 944 and a memory 946 storing a training component 948. In some examples, the training component 948 may include training data that has been generated by a simulator.

The processor(s) 916 of the vehicle 102 and the processor(s) 944 of the computing device(s) 942 may be any suitable processor capable of executing instructions to process data and perform operations as described herein. By way of example, the processor(s) 916 and 944 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 918 and 946 are examples of non-transitory computer-readable media. The memory 918 and 946 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 918 and 946 may include at least a working memory and a storage memory. For example, the working memory may be a high-speed memory of limited capacity (e.g., cache memory) that is used for storing data to be operated on by the processor(s) 916 and 944. In some instances, the memory 918 and 946 may include a storage memory that may be a lower-speed memory of relatively large capacity that is used for long-term storage of data. In some cases, the processor(s) 916 and 944 may not operate directly on data that is stored in the storage memory, and data may need to be loaded into a working memory for performing operations based on the data, as discussed herein.

It should be noted that while FIG. 9 is illustrated as a distributed system, in alternative examples, components of the vehicle 102 may be associated with the computing device(s) 942 and/or components of the computing device(s) 942 may be associated with the vehicle 102. That is, the vehicle 102 may perform one or more of the functions associated with the computing device(s) 942, and vice versa.

EXAMPLE CLAUSES

A. A system comprising: one or more processors; and one or more non-transitory computer-readable media storing instructions executable by the one or more processors, wherein the instructions, when executed, cause the system to perform operations comprising: receiving image data comprising a plurality of image frames from an image sensor associated with a vehicle; associating a first image frame and a second image frame of the plurality of image frames with a first data chunk; identifying first metadata associated with the first image frame; identifying second metadata associated with the second image frame; creating the first data chunk that includes the first image frame, the second image frame, the first metadata, and the second metadata; and storing the first data chunk in a video container, wherein the video container is indexed to access the first image frame with the first metadata or the second image frame with the second metadata.

B. The system of paragraph A, the operations further comprising: creating a second data chunk including a third image frame of the plurality of image frames and a third metadata associated with the third image frame; and storing the second data chunk in the video container, wherein the first data chunk is discreetly decodable independent of accessing the second data chunk.

C. The system of paragraph B, wherein: the first data chunk comprises a first decode field that includes data for decoding the first data chunk; and the second data chunk comprises a second decode field that includes data for decoding the second data chunk.

D. The system of any of paragraphs A-C, wherein the first metadata identifies an uncompressed sub-region of the first image frame or a sub-region compressed using a different compression algorithm than a different sub-region of the first image frame.

E. The system of any of paragraphs A-D, the operations further comprising: compressing, based at least in part on a lossy compression algorithm, a first portion of the first data chunk; and compressing, based at least in part on a lossless compression algorithm, a second portion of the first data chunk.

F. A method comprising: receiving image data comprising a plurality of image frames from one or more image sensors associated with a vehicle; determining a first image frame of the image data; identifying first metadata associated with the first image frame, wherein the first metadata includes data to decode the first image frame; determining a second image frame of the image data; identifying second metadata associated with the second image frame, wherein the second metadata includes data to decode the second image frame independently of the first image frame; and creating a first video container that includes the first image frame, the second image frame, the first metadata, and the second metadata.

G. The method of paragraph F, further comprising: compressing, based at least in part on a first compression algorithm, the first image frame; and compressing, based at least in part on a second compression algorithm different from the first compression algorithm, the second image frame.

H. The method of paragraph F or G, wherein: the first metadata identifies a sub-region of the first image frame; and the sub-region is uncompressed or compressed using a lossless compression algorithm.

I. The method of paragraph H, wherein the sub-region of the first image frame is based on a region of interest associated with a bounding box.

J. The method of any of paragraphs F-I, wherein the first metadata stores an uncompressed sub-region of the first image frame.

K. The method of any of paragraphs F-J, further comprising: compressing, based at least in part on a lossy compression algorithm, a first part of the first image frame, wherein the first part is less than all of the first image frame and wherein the first metadata indicates which portion of the first image frame is compressed.

L. The method of any of paragraphs F-K, further comprising storing second data in the first video container, wherein the second data is a different data type than the image data.

M. The method of any of paragraphs F-L, further comprising: identifying a diagnostic metric associated with the image sensor; and storing the diagnostic metric in the first metadata.

N. The method of any of paragraphs F-M, wherein a first size of the first metadata is different from a second size of the second metadata.

O. The method of any of paragraphs F-N, wherein the first metadata comprises at least one of: timing data; pixel clock data; row readout data; image sensor exposure data; image sensor gain data; image sensor state data; image sensor processor tuning parameter data; lidar scan data; diagnostic metrics; image frame sub-region data; or an indication of whether a lidar scan is associated with the first image frame.

P. One or more non-transitory computer-readable media storing instructions that, when executed, cause one or more processors to perform operations comprising: receiving image data comprising a plurality of image frames from one or more image sensors associated with a vehicle; determining a first image frame of the image data; identifying first metadata associated with the first image frame, wherein the first metadata includes data to decode the first image frame; determining a second image frame of the image data; identifying second metadata associated with the second image frame, wherein the second metadata includes data to decode the second image frame independently of the first image frame; and creating a first video container that includes the first image frame, the second image frame, the first metadata, and the second metadata.

Q. The one or more non-transitory computer-readable media of paragraph P, wherein the operations further comprise: storing the first image frame with a third image frame, wherein the first metadata includes data to decode the first image frame and the third image frame; and wherein the first metadata includes metadata specific to the first image frame and metadata specific to the third image frame.

R. The one or more non-transitory computer-readable media of paragraph P or Q, wherein the operations further comprise: compressing, based at least in part on a lossy compression algorithm, a first part of the first image frame; and compressing, based at least in part on a lossless compression algorithm, a second part of the first image frame.

S. The one or more non-transitory computer-readable media of any of paragraphs P-R, wherein the first metadata identifies an uncompressed sub-region of the first image frame.

T. The one or more non-transitory computer-readable media of any of paragraphs P-S, wherein the first metadata comprises at least one of: timing data; pixel clock data; row readout data; image sensor exposure data; image sensor gain data; image sensor state data; image sensor processor tuning parameter data; lidar scan data; diagnostic metrics; image frame sub-region data; or an indication of whether a lidar scan is associated with the first image frame.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein described need not be performed in the order disclosed, and other examples using alternative orderings of the computations could be readily implemented. In addition to being reordered, the computations could also be decomposed into sub-computations with the same results.

What is claimed is:

1. A method comprising:
receiving image data comprising a plurality of image frames from an image sensor associated with a vehicle, the image data associated with a single video stream;
determining a first image frame of the image data;
identifying first metadata associated with the first image frame, wherein the first metadata includes data to decode the first image frame, the first metadata identifies a sub-region of the first image frame, the sub-region is uncompressed or compressed using a lossless compression algorithm, and the sub-region of the first image frame is based on a region of interest associated with a bounding box;
determining a second image frame of the image data;
identifying second metadata associated with the second image frame, wherein the second metadata includes data to decode the second image frame independently of the first image frame; and
creating a data chunk that includes the first image frame of the single video stream, the second image frame of the single video stream, the first metadata, and the second metadata for storage in a video container.

2. The method of claim 1, further comprising:
compressing, based at least in part on a first compression algorithm, the first image frame; and
compressing, based at least in part on a second compression algorithm different from the first compression algorithm, the second image frame.

3. The method of claim 1, wherein the first metadata stores an uncompressed sub-region of the first image frame.

4. The method of claim 1, further comprising:
compressing, based at least in part on a lossy compression algorithm, a first part of the first image frame, wherein the first part is less than all of the first image frame and wherein the first metadata indicates which portion of the first image frame is compressed.

5. The method of claim 1, further comprising storing second data in the video container, wherein the second data is a different data type than the image data.

6. The method of claim 1, further comprising:
identifying a diagnostic metric associated with the image sensor; and
storing the diagnostic metric in the first metadata.

7. The method of claim 1, wherein a first size of the first metadata is different from a second size of the second metadata.

8. The method of claim 1, wherein the first metadata comprises at least one of:
timing data;
pixel clock data;
row readout data;
image sensor exposure data;
image sensor gain data;
image sensor state data;

image sensor processor tuning parameter data;
lidar scan data;
diagnostic metrics;
image frame sub-region data; or
an indication of whether a lidar scan is associated with the first image frame.

9. One or more non-transitory computer-readable media storing instructions that, when executed, cause one or more processors to perform operations comprising:
receiving image data comprising a plurality of image frames from an image sensor associated with a vehicle, the image data associated with a single video stream;
determining a first image frame of the image data;
identifying first metadata associated with the first image frame, wherein the first metadata includes data to decode the first image frame, the first metadata identifies a sub-region of the first image frame, the sub-region is uncompressed or compressed using a lossless compression algorithm, and the sub-region of the first image frame is based on a region of interest associated with a bounding box;
determining a second image frame of the image data;
identifying second metadata associated with the second image frame, wherein the second metadata includes data to decode the second image frame independently of the first image frame; and
creating a data chunk that includes the first image frame of the single video stream, the second image frame of the single video stream, the first metadata, and the second metadata for storage in a video container.

10. The one or more non-transitory computer-readable media of claim 9, wherein the operations further comprise:
storing the first image frame with a third image frame, wherein the first metadata includes data to decode the first image frame and the third image frame; and
wherein the first metadata includes metadata specific to the first image frame and metadata specific to the third image frame.

11. The one or more non-transitory computer-readable media of claim 9, wherein the operations further comprise:
compressing, based at least in part on a lossy compression algorithm, a first part of the first image frame; and
compressing, based at least in part on a lossless compression algorithm, a second part of the first image frame.

12. The one or more non-transitory computer-readable media of claim 9, wherein the first metadata identifies an uncompressed sub-region of the first image frame.

13. The one or more non-transitory computer-readable media of claim 9, wherein the first metadata comprises at least one of:
timing data;
pixel clock data;
row readout data;
image sensor exposure data;
image sensor gain data;
image sensor state data;
image sensor processor tuning parameter data;
lidar scan data;
diagnostic metrics;
image frame sub-region data; or
an indication of whether a lidar scan is associated with the first image frame.

14. The one or more non-transitory computer-readable media of claim 9, wherein the first metadata comprises at least one of:
timing data;
pixel clock data;
row readout data;
image sensor exposure data;
image sensor gain data;
image sensor state data;
image sensor processor tuning parameter data;
lidar scan data;
diagnostic metrics;
image frame sub-region data; or
an indication of whether a lidar scan is associated with the first image frame.

15. A system comprising:
one or more processors; and
one or more non-transitory computer-readable media storing instructions executable by the one or more processors, wherein the instructions, when executed, cause the system to perform operations comprising:
receiving image data comprising a plurality of image frames from an image sensor associated with a vehicle, the image data associated with a single video stream;
determining a first image frame of the image data;
identifying first metadata associated with the first image frame, wherein the first metadata includes data to decode the first image frame, the first metadata identifies a sub-region of the first image frame, the sub-region is uncompressed or compressed using a lossless compression algorithm, and the sub-region of the first image frame is based on a region of interest associated with a bounding box;
determining a second image frame of the image data;
identifying second metadata associated with the second image frame, wherein the second metadata includes data to decode the second image frame independently of the first image frame; and
creating a data chunk that includes the first image frame of the single video stream, the second image frame of the single video stream, the first metadata, and the second metadata for storage in a video container.

16. The system of claim 15, the operations further comprising:
compressing, based at least in part on a first compression algorithm, the first image frame; and
compressing, based at least in part on a second compression algorithm different from the first compression algorithm, the second image frame.

17. The system of claim 15, the operations further comprising:
compressing, based at least in part on a lossy compression algorithm, a first part of the first image frame, wherein the first part is less than all of the first image frame and wherein the first metadata indicates which portion of the first image frame is compressed.

18. The system of claim 15, wherein the first metadata stores an uncompressed sub-region of the first image frame.

19. The system of claim 15, the operations further comprising storing second data in the video container, wherein the second data is a different data type than the image data.

20. The system of claim 15, wherein the first metadata comprises at least one of:
timing data;
pixel clock data;
row readout data;
image sensor exposure data;
image sensor gain data;
image sensor state data;
image sensor processor tuning parameter data;
lidar scan data;

diagnostic metrics;
image frame sub-region data; or
an indication of whether a lidar scan is associated with the first image frame.

* * * * *